(12) United States Patent
Azimi et al.

(10) Patent No.: US 7,405,980 B1
(45) Date of Patent: *Jul. 29, 2008

(54) SHARED TERMINAL MEMORY INTERFACE

(75) Inventors: Saeed Azimi, Union City, CA (US); Po-Chien Chang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/014,777

(22) Filed: Dec. 20, 2004

Related U.S. Application Data

(62) Division of application No. 10/778,592, filed on Feb. 17, 2004, now Pat. No. 6,868,470, which is a division of application No. 09/620,545, filed on Jul. 20, 2000, now Pat. No. 6,859,399.

(60) Provisional application No. 60/205,795, filed on May 17, 2000.

(51) Int. Cl.
*G11C 7/10* (2006.01)

(52) U.S. Cl. .......................... 365/189.03; 365/189.011; 365/189.02; 365/230.02; 711/149; 711/104; 370/280; 370/294; 370/314; 370/321

(58) Field of Classification Search ............. 365/189.03
See application file for complete search history.

(56) References Cited

U.S. PATENT DOCUMENTS

| 5,524,230 | A | 6/1996 | Sakaue et al. |
| 5,577,236 | A | 11/1996 | Johnson et al. |
| 6,167,487 | A | 12/2000 | Camacho et al. |
| 6,170,036 | B1 | 1/2001 | Konishi et al. |
| 6,173,356 | B1 | 1/2001 | Rao |
| 6,233,195 | B1 | 5/2001 | Yamazaki et al. |
| 6,249,840 | B1 | 6/2001 | Peters |
| 6,260,101 | B1 | 7/2001 | Hansen et al. |
| 6,427,196 | B1 | 7/2002 | Adiletta et al. |

FOREIGN PATENT DOCUMENTS

| JP | 62098761 A | * | 5/1987 |
| JP | 03214275 A | * | 9/1991 |
| JP | 6266857 | | 9/1994 |
| JP | 7182852 | | 7/1995 |
| JP | 2001092771 | | 4/2001 |

OTHER PUBLICATIONS

Freedman, Alan. "The Computer Desktop Encyclopedia", 1999, Amacom, 2nd Ed., p. 154.*

* cited by examiner

*Primary Examiner*—B. James Peikari

(57) ABSTRACT

A memory architecture for a disk drive system in which Synchronous Random Access Memory (SRAM) and Dynamic Random Access Memory (DRAM) functions are provided on separate integrated circuits, and an interface protocol for transmitting information between these two memory components are provided to improve performance of the system, as well as reduce pin count and cost. An integrated circuit memory includes a random-access memory. The random-access memory includes a first terminal for receiving selection information. The random-access memory includes a second terminal for selectively (i) receiving a command, or (ii) receiving or transmitting data in accordance with the selection information received by the first terminal.

12 Claims, 4 Drawing Sheets

SHARED TERMINAL MEMORY INTERFACE

This application is a divisional of U.S. application Ser. No. 10/778,592, filed Feb. 17, 2004, which is now U.S. Pat. No. 6,868,470 which is a divisional of U.S. application Ser. No. 09/620,545, which is now U.S. Pat. No. 6,859,399 filed Jul. 20, 2000, which claims priority under 35 U.S.C. § 119(e) to U.S. Provisional Application No. 60/205,795, entitled "Memory Architecture and System, and Interface Protocol," filed May 17, 2000, the contents of each of which are incorporated by reference herein.

BACKGROUND

1. Field of the Invention

The present invention relates to a memory architecture which may be employed in connection with a hard disk drive controller in a mass storage integration product. The invention further relates to an interface protocol for a memory system, and a method for transmitting signals within the memory architecture.

2. Background Information

Conventional mass storage integration products, such as hard disk drive systems, typically employ a conventional memory architecture as shown in FIG. 1. As shown in the figure, such an architecture employs a Synchronous Dynamic Random Access Memory (SDRAM) controller 12 located "on-board," that is, on a semiconductor chip that includes other system components such as a hard disk drive controller, microprocessor, read/write channel and a buffer manager interface 14 with which the controller 12 is in bi-directional communication. The buffer manager interface 14 provides access to a buffer manager. A standard SDRAM 16 located "off-board," that is, externally to the semiconductor chip on which the SDRAM controller is embodied, is in communication with the controller to allow sequential transfer of blocks of data between the SDRAM and the controller. The bandwidth of this transmission path is typically around 200 Mbytes/s. As shown in FIG. 1, the signals transmitted between standard SDRAM 16 and SDRAM controller 12 include address and data signals (Adr [11:0] and Data [15:0] or [31:0] respectively), lower and upper data mask signals (LDQM and UDQM respectively), a write enable signal (WE_N), column and row address setting signals (CAS and RAS respectively), a clock enable signal (CKE), and a clock signal (CLOCK).

One problem with this memory architecture is that the SDRAM 16 includes both direct memory access (DMA) and random memory access. This is a disadvantage in disk systems because it lowers its overall performance. Such an SDRAM has other drawbacks as well. It has relatively high power requirements, as well as a high pin count. Moreover, because of their low volume production, such SDRAM chips suffer from low availability and relatively high cost.

Accordingly, there is a need for a memory architecture for disk drive applications and the like that reduces or eliminates these shortcomings of conventional SDRAM memory architecture.

SUMMARY OF THE INVENTION

It is therefore an object of the present invention to provide a memory architecture which overcomes the above-mentioned problems.

It is another object of this invention to provide a memory architecture where direct memory access and random memory access functions are embodied on separate integrated circuits.

It is a further object of this invention to provide an interface protocol and signaling method that overcomes the above-mentioned problems.

According to one aspect of the invention, a mass storage integration product is provided. The product comprises a mass storage medium; a transducer in communication with the mass storage medium; a first integrated circuit comprising a first memory, preferably a dynamic random-access memory, including a dynamic memory access block having a first terminal for receiving selection information, and a second terminal for selectively (i) receiving a command, or (ii) receiving or transmitting data in accordance with the selection information received by the first terminal; and a second integrated circuit comprising a controller in communication with the transducer, and a second memory, preferably a static random-access memory, having a random-access block. The first memory receives the selection information and the command from the second integrated circuit and transmits data to, or receives data from, the second integrated circuit.

Preferably, the command and data received at the second terminal are time-multiplexed. Also, address information is preferably received with the command at the second terminal, and the received command, data and address information are time-multiplexed.

The random-access block of the second memory preferably further includes a sub-block of tables and a sub-block of program codes. The second memory may also include a dynamic memory access block for the controller, which is preferably a hard disk controller.

In another aspect, the invention involves a memory architecture which comprises a first memory component including a dynamic memory access block having a first terminal for receiving selection information, and a second terminal for selectively (i) receiving a command, or (ii) receiving or transmitting data in accordance with the selection information received by the first terminal; and a second, separate, memory component including a random-access block.

Preferably, the construction of, and information transmitted between, the first and second memory components is as described above with respect to the memories of the mass storage integration product. Also, the first and second memory components are preferably embodied on separate integrated circuits.

Another aspect of the invention involves an integrated circuit memory comprising a random-access memory having a first terminal for receiving selection information; and a second terminal for selectively (i) receiving a command, or (ii) receiving or transmitting data in accordance with the selection received by the first terminal.

Preferably, the command and data received at the first terminal are time-multiplexed. Address information is preferably received with the command, in which case the command, data and address information are time-multiplexed.

In accordance with another aspect, the invention may also be embodied in a method for transferring data between a first memory (e.g., a dynamic random-access memory) having a dynamic memory access block and a controller including a second memory (e.g., a static random-access memory) having a random-access block. The method comprises receiving selection information transmitted from the controller at a first terminal of the first memory; and, at a second terminal of the first memory, selectively (i) receiving a command transmitted from the controller, or (ii) receiving data from, or transmitting data to, the controller, in accordance with the selection information received by the first terminal.

Preferably, the construction of, and information transmitted between, the first and second memory components is as described above with respect to the memories of the mass storage integration product.

According to yet another aspect of the invention, an interface protocol for a memory system, is provided. The protocol comprises a selection signal; and a time-multiplexed signal selectively comprising (i) a command, or (ii) data in accordance with the selection signal, and preferably further comprising (iii) an address with the command.

Other objects and attainments together with a fuller understanding of the invention will become apparent and appreciated by referring to the following description and claims taken in conjunction with the accompanying drawings.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
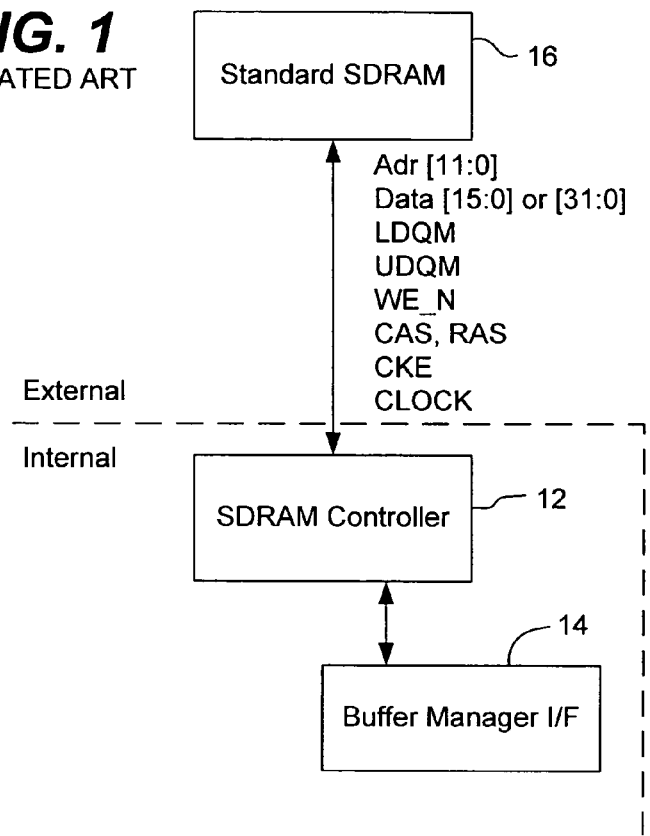
FIG. 1 is a block diagram of a conventional memory architecture used in disk drive systems.
Figure 2:
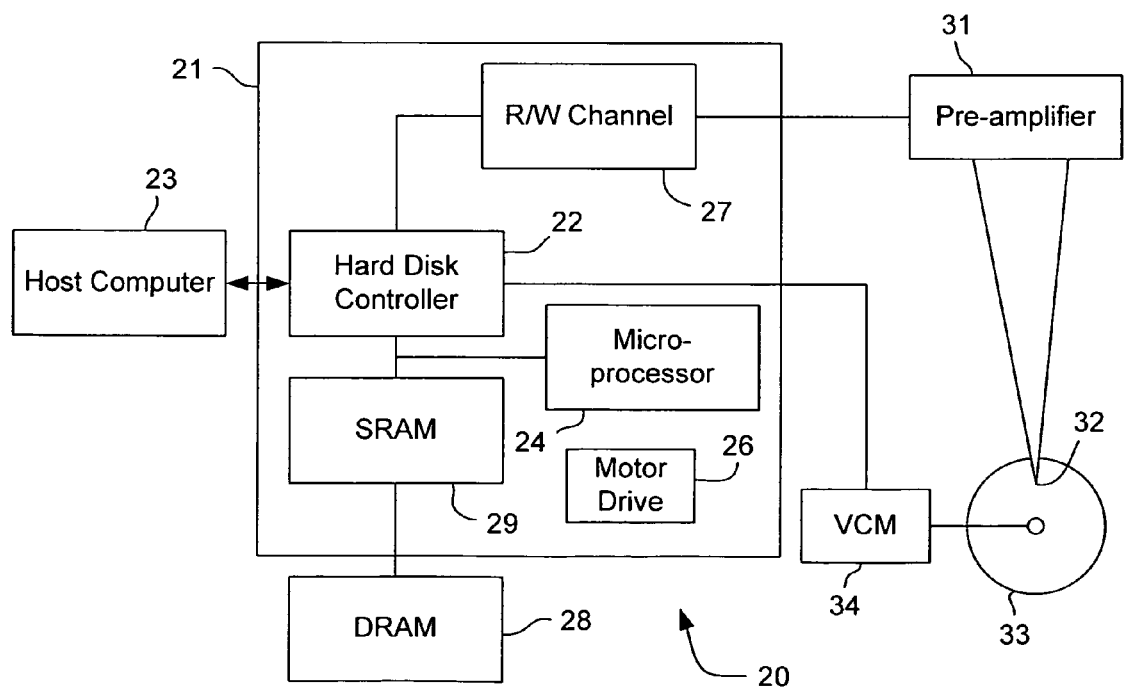
FIG. 2 is a block diagram of a disk drive system in which the present invention may be employed.

FIG. 2 is a schematic diagram of a disk drive system 20, which is a type of mass storage integration product in which the present invention may be employed. The system includes a disk drive 21 that may be of a 2-, 4- or 8-channel configuration. The disk drive, which may be embodied on a single semiconductor chip, is comprised of a hard disk controller (HDC) 22 that interfaces with a host device, such as a host computer 23, and further comprises a microprocessor 24 in communication with the HDC. Disk drive 21 also includes a motor driver 26 and a read/write (R/W) channel 27, the output of which is supplied to the HDC.

Disk drive system 20 further includes a pre-amplifier integrated circuit 31 that generates an output signal which is supplied as an input to the R/W channel. The pre-amplifier is in communication with a recording head 32 for transmitting information to and from disk 33. The recording head 32 may be a Magneto-Resistive (MR) or Giant Magneto-Resistive (GMR) recording head. A voice coil motor driver (VCM) 34 interfaces between the HDC and the disk.

In accordance with aspects of the invention, disk drive system 20 includes two separate memory components: a first memory 28 located externally, i.e., "off-board," of the semiconductor chip on which the disk drive is embodied, and a second memory 29, in communication with the first memory, which is embodied "on-board" the disk drive semiconductor chip. The on-board memory 28 interfaces with various logic components. Such components, as well as the structure and function of these memory components are described in more detail below.

Figure 3:
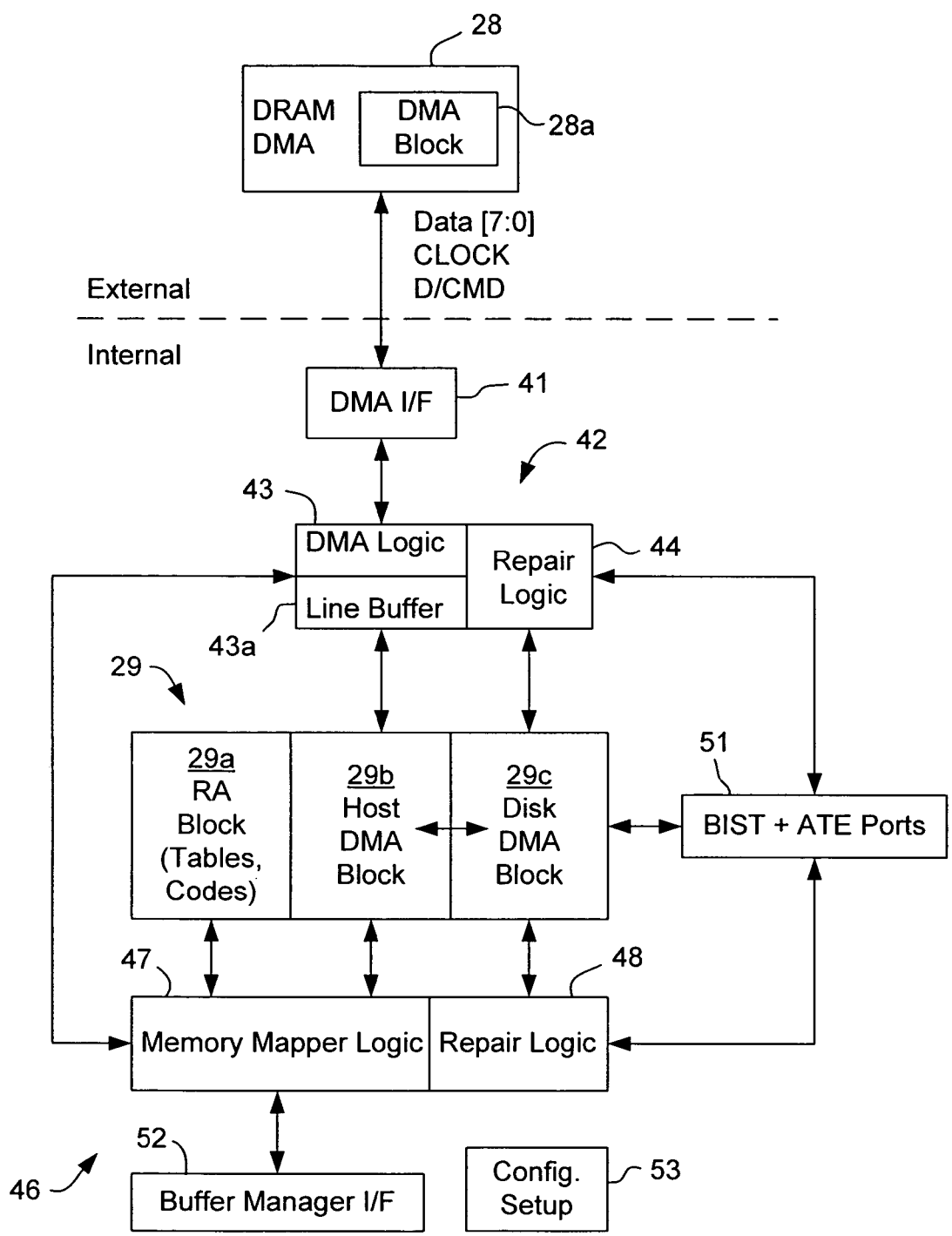
FIG. 3 is a block diagram of a memory architecture, in accordance with embodiments of the invention.

Referring now to FIG. 3, a block diagram of a memory architecture in accordance with embodiments of the invention is illustrated. This memory architecture comprises the first (off-board) memory 28 which is a DRAM and includes a direct memory access (DMA) block 28a and the second (on-board) memory 29 which is an SRAM having a random access (RA) block 29a, a host DMA block 29b and a disk DMA block 29c for the controller 22. The RA block includes a sub-block of tables and a sub-block of program codes.

Off-board DRAM 28 is in bi-directional communication with various on-board components including the SRAM 29 through a DMA interface 41 to allow sequential transfer of blocks of data between the DRAM and on-board components. Such other on-board components include two logic blocks, each having sub-block components. One of those logic blocks, identified generally by the reference numeral 42, includes a DMA logic block 43 that is in bi-directional communication with DMA interface 41 and that includes a line buffer 43a. Logic block 42 further includes a repair logic block 44 that is electrically connected to DMA logic block 43. The other of those logic blocks 46 includes a memory mapper logic block 47 in bi-directional communication with the DMA logic block 43, and a repair logic block 48 electrically connected to block 47.

Each of the repair logic blocks 44 and 48, as well as the on-board SRAM 29 interface with a built-in self-test (BIST) circuit 51 which provides the on-board circuitry with the ability to test itself without the use of an external test resource for pattern generation and comparison purposes. BIST 51 includes automatic test equipment (ATE) ports.

The on-board circuitry also includes a buffer manager interface 52 that is in communication with memory mapper logic block 47 and that provides access to a buffer manager (not shown). Configuration set up circuitry 53 is also provided.

Figure 4:
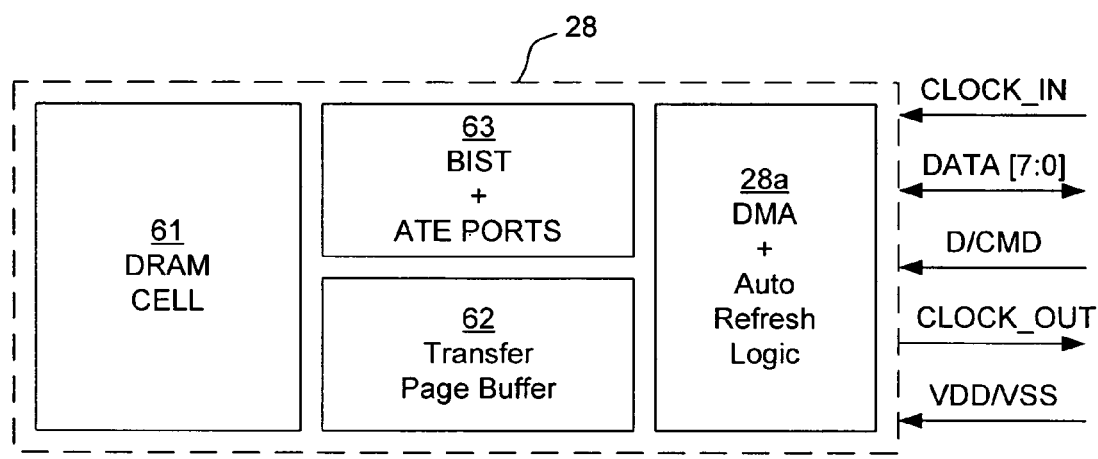
FIG. 4 is a block diagram of an off-board DRAM and the interface signals transmitted between the DRAM and the on-board circuitry, in accordance with embodiments of the invention.

Referring now to FIG. 4, the details of off-board DRAM 28 as well as the interface signals transmitted between the DRAM and the on-board components are illustrated. DRAM 28 is a low pin count (about 14-20 pins) integrated circuit that provides DMA transfers only at about 400 Mbytes/s in low power mode and higher transfer rates (approximately 800 Mbytes/s) in a Dual Data Rate (DDR) mode in which data is latched on both the rising and falling edges of the clock. DRAM 28 preferably has a single-ended low voltage swing of less than 1 V.

As illustrated in FIG. 4, DRAM 28 includes a DRAM cell 61 for dynamic off-board storage of information. DMA block 28a interfaces with the on-board components and also includes auto refresh logic to "refresh" lost capacitor charge at periodic intervals. DRAM 28 further includes a transfer page buffer 62 that supports DMA transfers in page mode with programmable page size at a bandwidth of about 400 Mbytes/s in a low power mode and about 800 Mbytes/s in DDR mode. BIST circuitry with ATE ports 63 provide DRAM 28 with a self-repair feature.

In a preferred embodiment, the interface between the DRAM and the on-board components includes a bit wide CLOCK_IN signal sourced from the on-board circuitry and received by DRAM 28 for write operations, a bit wide CLOCK_OUT signal sourced from the DRAM for read operations, a bi-directional byte-wide data/command path (DATA [7:0]), and a bit wide data/command indicator signal (D/CMD) on which data/command selection information is received by the DRAM. A power supply signal (VDD/VSS) is also provided. The DRAM is provided with appropriate terminals for receiving or transmitting the various interface signals.

Access to DRAM 28 is divided into three signaling phases: command, address and data. The first phase is the command phase, which is followed, depending on the command type, by either (i) one address and multiple data phases, (ii) just a single data phase, or (iii) just one command (i.e., RESET command).

Figure 5:
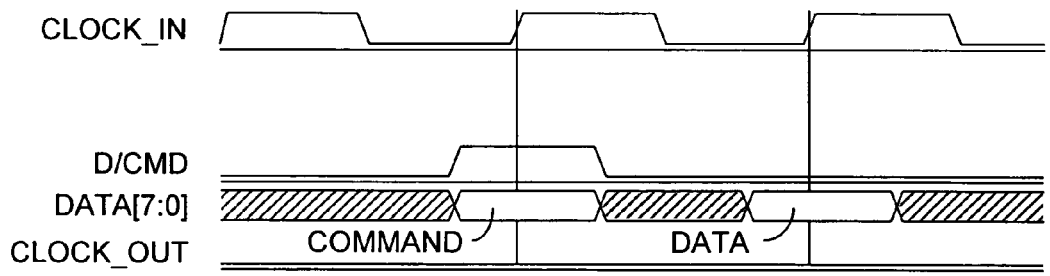
FIG. 5 is a timing diagram illustrating the timing of various interface signals in a configuration access mode of operation.

Configuration access is comprised of one command (e.g., a configuration command) and one data phase. It is used for programming various functions including, but not limited to, page size, refresh period, access type (Single Date Rate (SDR) or DDR) and read latency (i.e., the delay between receipt of a read address and transfer of the first data out). An exemplary timing diagram of the CLOCK_IN, D/CMD, DATA [7:0] and CLOCK_OUT signals in the configuration access mode is illustrated in FIG. 5. Assertion of the D/CMD signal, which provides selection information, is approximately centered on an edge (e.g., the rising edge) of CLOCK_IN. The COMMAND issued on the DATA [7:0] signal is synchronous with the assertion of the D/CMD signal, followed by the data phase (DATA).

Read and write access each contain one command, one address, and multiple data phases (i.e., one page of data). After receiving one starting address, DRAM 28 will return or store a pre-programmed size of data. CLOCK_OUT is used in the read access mode to avoid a clock skew problem between the on-board components and the DRAM. If DDR mode is used, data transfer occurs on both edges of CLOCK_OUT in the read access mode and on both edges of CLOCK_IN in the write access mode. For read data access, the first byte of data is returned after the programmed read latency period. There is no latency period for write data access. Exemplary timing diagrams of the CLOCK_IN, D/CMD, DATA [7:0] and CLOCK_OUT signals in the read and write access modes are illustrated in FIGS. 6 and 7, respectively.

Figure 6:
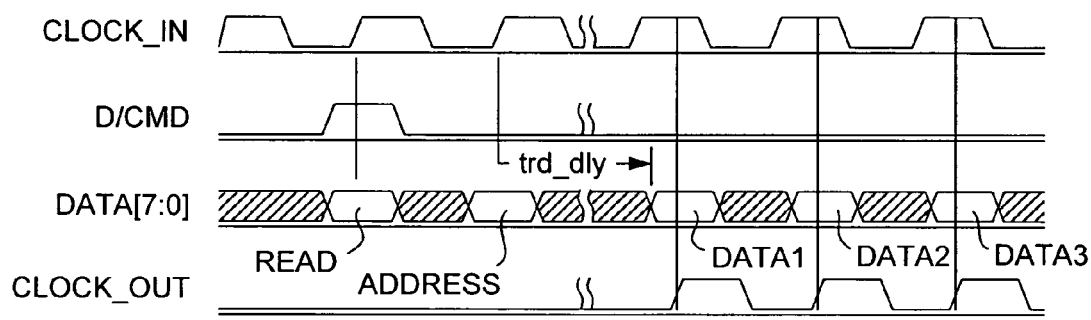
FIG. 6 is a timing diagram illustrating the timing of various interface signals in a data read access mode of operation.

As shown in FIG. 6, a READ command is issued on the DATA [7:0] signal synchronous with the assertion of the D/CMD signal which is approximately centered on an edge (e.g., the rising edge) of CLOCK_IN. An ADDRESS is then issued on the DATA [7:0] signal, approximately centered on the rising edge of CLOCK_IN, followed by multiple data phases (DATA 1, DATA2, DATA3, etc.), approximately centered on the rising edge of CLOCK_OUT.

Figure 7:
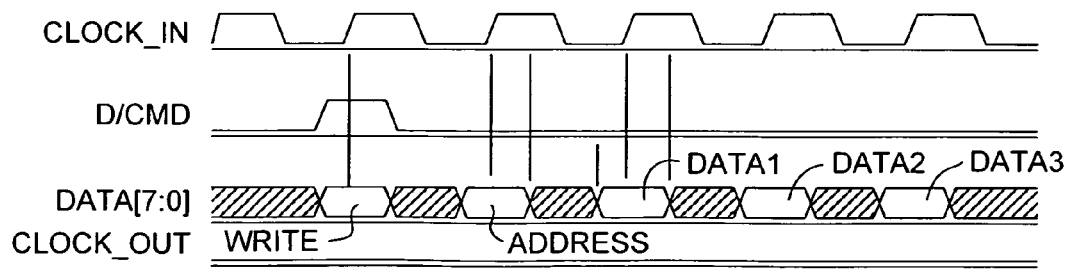
FIG. 7 is a timing diagram illustrating the timing of various interface signals in a data write access mode of operation.

As shown in FIG. 7, a WRITE command is issued on the DATA [7:0] signal synchronous with the assertion of the D/CMD signal which is approximately centered on an edge (e.g., the rising edge) of CLOCK_IN. An ADDRESS is then issued on the DATA [7:0] signal, approximately centered on the rising edge of CLOCK_IN, followed by multiple data phases (DATA 1, DATA2, DATA3, etc.), also approximately centered on the rising edge of CLOCK_IN.

The definitions of the READ and WRITE commands, as well as the other commands asserted on the DATA [7:0] signal are set forth in Table 1 below.

TABLE 1

| DATA [7:0] | Command |
|---|---|
| 0xxx_x000 | RESET |
| 0xxx_x001 | CONFIG |
| 0xxx_x010 | REPAIR |
| 0xxx_x011 | STATUS |

TABLE 1-continued

| DATA [7:0] | Command |
|---|---|
| 0xxx_x100 | WAKE |
| 0xxx_x101 | POWER SAVE |
| 1xxx_xxx1 | WRITE |
| 1xxx_xxx0 | READ |

Note that "x" means "don't care."

The RESET command is used to clear internal mode setting(s) and BIST logic.

The CONFIG command is used to configure DRAM 28. During the data phase, the bits written following the CONFIG command determine the read latency (trd_dly), the page size, the data mode (SDR or DDR), and the refresh period, in accordance with Table 2 below.

TABLE 2

| Read Latency<br>bit 7 and bit 6 | Page size<br>bit 5 and bit 4 | Mode<br>bit 3 | Refresh Period<br>bit 2, bit 1 and bit 0 |
|---|---|---|---|
| 00: 1 clk cycle | 00: 128 bytes | 0: SDR | bit[2:0] * base value |
| 01: 2 clk cycles | 01: 256 bytes | 1: DDR | (base_value TBD) |
| 10: 3 clk cycles | 10: 512 bytes | | |
| 11: 4 clk cycles | 11: 1024 bytes | | |

The REPAIR command is used to report defective locations in the DRAM cell back to the on-board logic.

The STATUS command is followed by a data phase indicating the status of DRAM 28. The status value is returned after the command phase in accordance with the Table 3 below.

TABLE 3

| bit 7 | bit 6 | bit 5/bit 4/bit 3 | bit 2 | bit 1 | bit 0 |
|---|---|---|---|---|---|
| rsvd | rsvd | repair_addr_cnt | rd_err | wr_err | bist_err |

A bist_err indicates a BIST operation error, which means there are internal DRAM defects. A wr_err indicates a write operation error, i.e., an early or late termination of a write operation, more or less data than the programmed page size was transferred during one write access. A rd_err indicates a read operation error, i.e., an early or late termination of a read operation, more or less data than the programmed page size was transferred during on read access. A repair_addr_cnt indicates that if internal defects exist (bist_err=1), up to eight locations will be transferred for REPAIR command. Bits 6 and 7 are reserved.

The WAKE command is used to bring DRAM 28 out of the POWER_SAVE mode, and the POWER_SAVE command is used to shut down an internal phase-lock loop (PLL) of DRAM 28 and to place the DRAM into the POWER_SAVE mode.

As previously explained, the WRITE and READ commands are each followed by an address phase which contains the starting address of a page and multiple data phases. The burst size is determined by the "page size" bits during the CONFIG cycle. In the read state, if trd_dly=0, the return of the first data will be delayed by the read latency period (trd_dly) which follows the command phase; however, if trd_dly=1, the first data will be valid immediately after the command phase.

It should be readily apparent from the foregoing description that the memory architecture of the present invention, which includes on-board SRAM and off-board DRAM, provides a high performance, low pin count and low cost solution to the problems associated with standard SDRAM in mass storage integration products. In addition, the interface between the MSI DRAM and the on-board circuitry eliminates the need for separate address lines.

While embodiments of the invention have been described, it will be apparent to those skilled in the art in light of the foregoing description that many further alternatives, modifications and variations are possible. The invention described herein is intended to embrace all such alternatives, modifications and variations as may fall within the spirit and scope of the appended claims.

What is claimed is:

1. An integrated circuit memory, comprising:
   a random-access memory including:
      a first terminal for receiving a select signal that does not include address information; and
      a second terminal for receiving commands, data, and address information and for selectively (i) receiving a command, and (ii) receiving or transmitting data in accordance with the select signal received by the first terminal, wherein the command initiates at least one of reading the data from the random-access memory and writing the data to the random-access memory.

2. The integrated circuit memory of claim 1, wherein the command and data received at the second terminal are time-multiplexed.

3. The integrated circuit memory of claim 1, wherein address information is received at the second terminal with the command.

4. The integrated circuit memory of claim 3, wherein the command, data and address information received at the second terminal are time-multiplexed.

5. An integrated circuit memory, comprising:
   random-access memory means including:
      first terminal means for receiving a select signal that does not include address information; and
      second terminal means for receiving commands, data, and address information and for selectively (i) receiving a command, and (ii) receiving or transmitting data in accordance with the select signal received by the first terminal means, wherein the command initiates at least one of reading the data from the random-access memory and writing the data to the random-access memory.

6. The integrated circuit memory of claim 5, wherein the command and data received at the second terminal means are time-multiplexed.

7. The integrated circuit memory of claim 5, wherein address information is received at the second terminal with the command.

8. The integrated circuit memory of claim 7, wherein the command, data and address information received at the second terminal means are time-multiplexed.

9. A method of interfacing for a memory system, comprising the steps of:
   a.) receiving a select signal that does not include address information at a first terminal; and
   b.) selectively:
      (i) receiving a command at a second terminal for receiving commands, data, and address information, and
      (ii) receiving or transmitting data in accordance with the select signal received in step (a) at the second terminal,
   wherein the command initiates at least one of reading and writing the data at the first terminal.

10. The method of claim 9, comprising the step of:
    c.) time-multiplexing the command and data received in step (b).

11. The method of claim 9, comprising the step of:
    c.) receiving address information at the second terminal with the command in step (b).

12. The method of claim 11, comprising the step of
    d.) time-multiplexing the command, data and address information received in step (b).

* * * * *